INVENTORS.
HAROLD K. COULTER,
PHILIP M. CRUSE,
DARYL D. ERRETT,

BY John M. Koch

ATTORNEY.

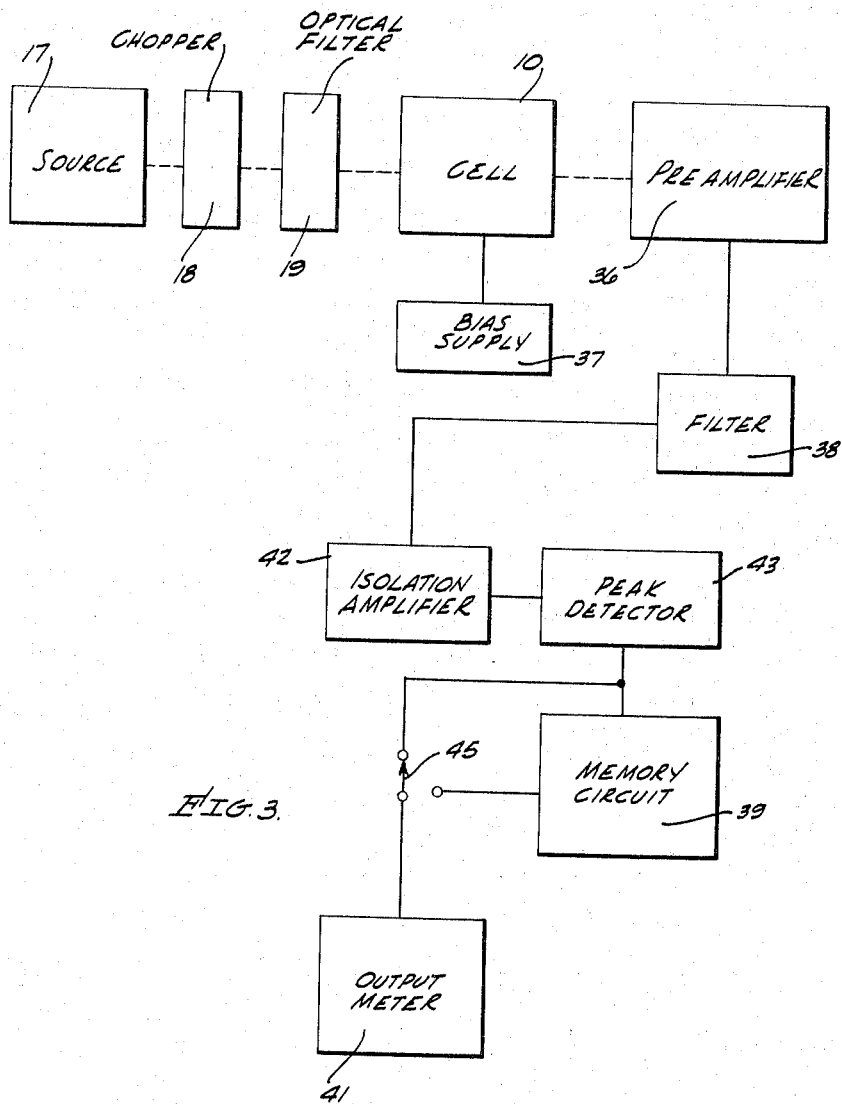

3,315,075
INFRARED DETECTOR TESTING SYSTEM COMPRISING SCANNING THE DETECTOR SURFACE WITH A POINT-SOURCE OF RADIATION
Harold K. Coulter, Philip M. Cruse, and Daryl D. Errett, Santa Barbara, Calif., assignors to Santa Barbara Research Center, Goleta, Calif., a corporation of California
Filed June 1, 1964, Ser. No. 371,488
5 Claims. (Cl. 250—83.3)

This invention relates to a system for testing the responsivity of a photosensitive detector, and particularly to a testing device for ascertaining the responsivity of an infrared detector at a series of points over the surface area thereof.

Prior art testing devices of this type usually rely on mechanical stages to provide bodily movement of the photosensitive detector so that it can be tested at a series of points over its surface area. These prior art devices become increasingly difficult to use as the detector to be moved becomes very small; the test readings generally are read from X–Y micrometer spindles used to bodily move the small detector and are then manually translated to a separate X–Y graph because the testing device itself does not automatically provide a plot of the detector surface points tested. Other prior art testing devices of this type employ refractive optics which have the disadvantage of limiting the spot size and optical bandwidth of the energy.

Accordingly, it is an important object of this invention to provide a photosensitive detector testing system which combines movement of a spot of testing energy over the surface area of the detector and the automatic production of a plot of responsivities of the detector surface points tested.

Another object of this invention is to provide a photosensitive detector testing system employing reflective optics and permitting the use of a wide variety of testing energy sources and small image sizes over wide bandwidths.

Additional objects will become apparent from the following description of the invention, which is given primarily for the purposes of illustration, and not limitation.

Stated in general terms, the objects of the invention are attained by providing a photosensitive detector testing system which involves moving a small directed point of energy over the small sensitive area of the photosensitive detector and automatically plotting the response of the detector at the surface points tested. An extensive optical demagnification is employed to produce the extremely small image or spot size required on the detector surface and the image is moved across the detector surface through a high mechanical advantage for imparting great accuracy. This image movement is simultaneously greatly amplified and translated to an automatic plotting or recording mechanism.

A more detailed description of a specific embodiment of the invention is given below with reference to the accompanying drawings, wherein:

FIG. 3 is a schematic block diagram showing the relationship of the infrared source to the detector cell and the electronic units to operate the cell and process its outputs.

Figure 1:
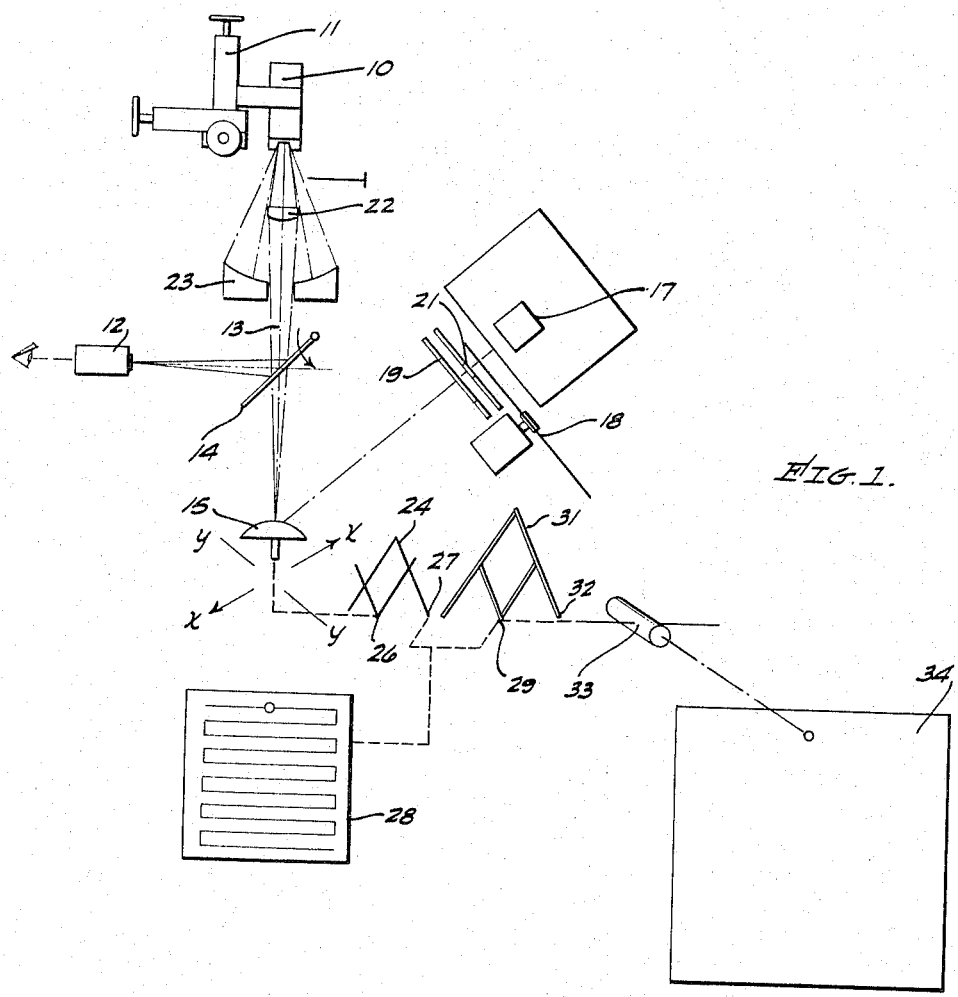
FIG. 1 is a schematic diagram showing the relationship of the various parts of the testing device.

The specific embodiment of the invention shown in FIG. 1 includes an infrared source and a mechanical-optical arrangement. The necessary electronic units to operate the detector of the system of FIG. 1 and process its outputs are shown schematically in FIG. 3.

The infrared detector cell 10 is preliminarily mechanically positioned with the aid of an X–Y–Z mounting fixture 11. A microscope 12 with an illuminated eyepiece is inserted in the optical path 13 with the aid of a flip-out mirror 14. Microscope 12, which is provided for rapid focus of very small detector cells 10, is set to have the same focal distance as the convex mirror 15, which also is in the optical path 13, and utilizes the operating objective of the microscope to focus cell 10 at its optimum point. The cell focus is critical because of the speed of the system, but once located with the microscope, it is the same under infrared illumination as under visual light. After detector cell 10 is optically positioned, flip-out mirror 14 is flipped out of optical path 13.

The infrared source 17 may be a stainless steel conical black body element which is capable of operating at controllable temperatures up to about 1000° C. However, an incandescent source, or other infrared sources, can be used. Source 17 is equipped with asynchronous modulator or chopper 18 which interrupts the energy from source 17 at a rate of about 810 c.p.s. A filter 19 is provided which serves to prevent diffraction limiting at longer wavelengths. A filter (not shown) may also be placed in optical path 13. A disk set with precision apertures provides a convenient means for changing the apparent size of the infrared source 17 as well as the total irradiance. Distance and aperture size can be varied.

Infrared detector cell 10 is tested while being irradiated by a small infrared image or spot, which is moved in a systematic manner across the active surface of the optically positioned cell. The output of cell 10, while held stationary in position, is monitored and recorded in relation to the infrared image placement on the active surface of the cell to automatically produce a two-dimensional, or X–Y plot which gives the responsivity contour of the cell.

An optical demagnification is necessary to produce the extremely small image or spot size required for the very small active surface of detector cell 10. This image is formed in two steps in the optical portion of the detector testing system of the invention. The first optical demagnification step is performed by reflecting the energy from infrared source 17 as determined by the aperture size 21 from the convex surface of spherical mirror 15. A reduction in aperture size from about 0.1 inch at aperture 21 to an aperture image of about 0.01 inch at convex mirror 15 is produced when using a convex mirror 15 having a radius of 2 inches and 10 inches removed from aperture 21.

The second step in the optical demagnification of the image or spot size utilized the reflecting optical system including convex mirror 22 and concave mirror 23 arranged as shown to further reduce the image size by a factor of about 15. The reflecting optical system 22, 23 has a large effective aperture and allows a very small image before becoming diffraction limited.

Figure 2:
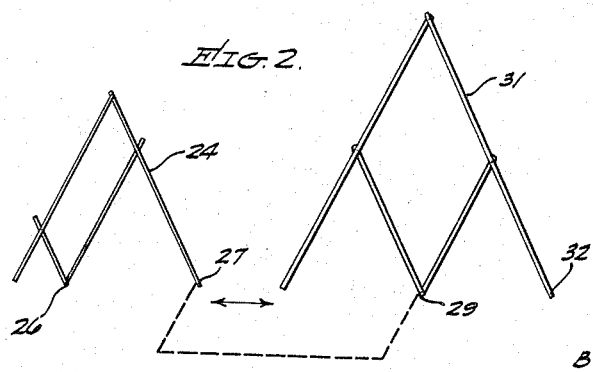
FIG. 2 is a schematic view showing a mirror-actuating pantograph unit and a projection lamp-actuating pantograph unit.

The resulting apparent source image from convex mirror 15 is moved across the active surface of cell 10 in X and Y directions with the aid of a mechanical scan mechanism. The mechanical scan mechanism includes a pantograph unit 24, more clearly shown in FIG. 2, which is coupled at 26 to convex mirror 15. The operator of the detector testing system, through point 27 of pantograph unit 24, and through motion reduced about 15 times for greater accuracy, moves convex mirror 15 over a definite pattern of raster 28.

The motion applied by the operator at point 27 of pantograph unit 24 also simultaneously is applied at point 29 of pantograph unit 31 and is multiplied by 2 at point 32 to which is coupled a small projection lamp 33. Pantograph units 24 and 31 are superimposed to accomplish this mode of action. Projection lamp 33 is moved under a glass screen 34 to provide the position information necessary to the X-Y responsivity contour plotting of cell 10 being tested.

The electronic system shown schematically in FIG. 3 is capable of providing high linear amplification of the output of cell 10 through amplifier 36, and of supplying bias through bias supply 37. The electric system also includes memory and indication circuits. Bias supply 37 supplies bias to cell 10, which may be a photoresistive detector from a variable monitored supply which can be set for the particular cell 10 being tested. The output from preamplifier 36 is amplified and filtered in filter circuit 38 at the chopping frequency before being rectified and held in the memory circuit 39 or presented on the output meter 41. Isolation amplifier 42 serves to isolate the filter and produce sufficient dynamic range to operate the detector circuit. Peak detector 43 rectifies carrier signals for presentation to memory circuit 39 or to output meter 41. Switch 45 determines if output meter 41 reads the instantaneous carrier signal value or the maximum signal produced over the detector as found stored in memory circuit 39.

As each cell 10 is scanned for the first time, memory circuit 39 holds the maximum output signal presented to it. This permits the operator to resist the system gain for a convenient meter reading and proper overall dynamic range. Memory circuit 39 is switched out and a contour plot is made using the 100%, 90% and 10%, or any other cardinal response points of cell 10 for plotting equipotential lines or areas.

The above-described system can be used in a reverse sense from that described. For example, it can be used to measure temperature differences in very small areas, such as an integrated microcircuit to sense heating effects by using a sensitive infrared detector in the place of infrared source 17 and the microcircuit in the place of cell 10.

Obviously many other modifications and variations of the photosensitive detector testing system of the present invention are possible in the light of the above teachings. It is, therefore, to be understood that, within the scope of the appended claims, the invention can be practiced otherwise than as specifically described.

What is claimed is:

1. A system for testing the responsivity of a photosensitive detector which comprises a source of radiant energy for producing an image of radiation emitted from the source, optical demagnification means coupled with the radiant energy source for demagnifying the radiation image to a size relatively small compared with the active surface of a photosensitive detector to be tested, a pantograph scan mechanism coupled to the optical demagnification means for moving the demagnified image across the active surface of a photoensitive detector to be tested, means for measuring the point responsivity of the active surface of a photosensitive detector to be tested, and a second pantograph means coupled to the pantograph scan mechanism for contour plotting the point responsivity of a photosensitive detector to be tested.

2. A system for testing the responsivity of a photosensitive detector which comprises a source of radiant energy for producing an image of radiation emitted from the source, convex and concave mirror optical demagnification means coupled with the radiant energy source for demagnifying the radiation image to a size relatively small compared with the active surface of a photosensitive detector to be tested, a pantograph scan mechanism coupled to the optical demagnification means for moving the demagnified image across the active surface of a photosensitive detector to be tested, means for measuring the point responsivity of the active surface of a photosensitive detector to be tested, and a second pantograph means coupled to the pantograph scan mechanism for contour plotting the point responsivity of a photosensitive detector to be tested.

3. A system for testing the responsivity of an infrared detector which comprises an infrared source for producing an infrared image, optical demagnification means coupled with the infrared source for demagnifying the infrared image to a size relatively small compared with the active surface of an infrared detector to be tested, a pantograph scan mechanism coupled to the optical demagnification means for moving the demagnified image across the active surface of an infrared detector to be tested, means for measuring the point responsivity of the active surface of an infrared detector to be tested, and a second pantograph means coupled to the pantograph scan mechanism for contour plotting the point responsivity of an infrared detector to be tested.

4. A system for testing the responsivity of an infrared detector which comprises an infrared source for producing an infrared image, convex and concave mirror optical demagnification means coupled with the infrared source for demagnifying the infrared image to a size relatively small compared with the active surface of an infrared detector to be tested, a pantograph scan mechanism coupled to the optical demagnification means for moving the demagnified image across the active surface of an infrared detector to be tested, means for measuring the point responsivity of the active surface of an infrared detector to be tested, and a second pantograph means coupled to the pantograph scan mechanism for contour plotting the point responsivity of an infrared detector to be tested.

5. A system for testing the responsivity of a photosensitive detector which comprises a source of radiant energy for producing an image of radiation emitted from the source, optical demagnification means having a plurality of elements optically coupled with the radiant energy source for demagnifying the radiation image to a size relatively small compared with the active surface of a photosensitive detector to be tested, a mechanical scan mechanism including a pantograph coupled to an element of the optical demagnification means for moving the demagnified image across the active surface of a photosensitive detector to be tested, means for measuring the point responsivity of the active surface of the photosensitive detector to be tested, and contour plotting means coupled to the mechanical scan mechanism for plotting the point responsivity of the photosensitive detector to be tested.

References Cited by the Examiner

UNITED STATES PATENTS

| | | | |
|---|---|---|---|
| 3,022,374 | 2/1962 | Brattain et al. | 250—83.3 X |
| 3,149,968 | 9/1964 | Stephens | 250—237 X |
| 3,201,961 | 8/1965 | Williams et al. | 88—14 X |

RALPH G. NILSON, *Primary Examiner.*

UNITED STATES PATENT OFFICE
CERTIFICATE OF CORRECTION

Patent No. 3,315,075                                       April 18, 1967

Harold K. Coulter et al.

It is hereby certified that error appears in the above numbered patent requiring correction and that the said Letters Patent should read as corrected below.

Column 1, line 29, after "energy" insert -- employed for testing the photosensitivity of the detector. --.

Signed and sealed this 14th day of November 1967.

(SEAL)
Attest:

Edward M. Fletcher, Jr.

Attesting Officer

EDWARD J. BRENNER

Commissioner of Patents